(12) United States Patent
Gibbons et al.

(10) Patent No.: US 7,005,165 B2
(45) Date of Patent: Feb. 28, 2006

(54) PHOTOSENSITIVE POLYIMIDES FOR OPTICAL ALIGNMENT OF LIQUID CRYSTALS

(75) Inventors: Wayne M. Gibbons, Bear, DE (US); Patricia A. Rose, Wilmington, DE (US); Paul J. Shannon, Exton, PA (US); Hanxing Zheng, Wilmington, DE (US)

(73) Assignee: Elsicon, Inc., Newark, DE (US)

( * ) Notice: Subject to any disclaimer, the term of this patent is extended or adjusted under 35 U.S.C. 154(b) by 571 days.

(21) Appl. No.: 09/739,937

(22) Filed: Dec. 19, 2000

(65) Prior Publication Data

US 2001/0046570 A1 Nov. 29, 2001

Related U.S. Application Data

(60) Continuation-in-part of application No. 09/618,193, filed on Jul. 18, 2000, now Pat. No. 6,313,348, which is a division of application No. 09/221,295, filed on Dec. 23, 1998, now Pat. No. 6,103,322.

(51) Int. Cl.
  *G02F 1/1337* (2006.01)
  *C09K 19/56* (2006.01)
  *C08G 69/26* (2006.01)

(52) U.S. Cl. ............. 428/1.2; 428/1.25; 428/1.26; 428/473.5; 428/474.4; 349/123; 349/135; 528/125; 528/172; 528/353; 528/422

(58) Field of Classification Search .......... 428/1, 428/1.23, 473.5, 1.25–1.27, 1.55, 474.4; 349/123, 125, 193; 528/170–171, 176, 185, 528/188, 220, 353, 125, 172, 422
See application file for complete search history.

(56) References Cited

U.S. PATENT DOCUMENTS

| | | | |
|---|---|---|---|
| 4,002,645 A | | 1/1977 | Sonnenberg ............. 260/345.2 |
| 5,276,132 A | | 1/1994 | Nishikawa et al. ......... 528/353 |
| 5,731,405 A | | 3/1998 | Gibbons et al. ............ 528/353 |
| 5,976,640 A | | 11/1999 | Yu et al. ...................... 428/1.1 |
| 6,001,277 A | * | 12/1999 | Ichimura et al. ......... 252/299.4 |
| 6,066,696 A | | 5/2000 | Yu et al. ..................... 525/178 |
| 6,103,322 A | * | 8/2000 | Gibbons et al. ........... 428/1.25 |
| 6,194,039 B1 | * | 2/2001 | Gibbons et al. ............ 428/1.1 |
| 6,224,788 B1 | | 5/2001 | Ogawa et al. ........... 252/299.4 |
| 6,713,135 B1 | * | 3/2004 | Gibbons et al. .......... 428/1.26 |

FOREIGN PATENT DOCUMENTS

| | | |
|---|---|---|
| EP | 0 580 108 A2 * | 1/1994 |
| JP | 5331116 | 12/1993 |
| WO | 9745497 | 12/1997 |
| WO | 9915576 | 4/1999 |

OTHER PUBLICATIONS

Database CAPLUS on STN, Acc. No. 484187, Furuya et al., "Diaminophenyl propargyl or allyl ethers and their manufacture." JP 05331116 A2 (Abstract).

* cited by examiner

*Primary Examiner*—Harold Pyon
*Assistant Examiner*—Sow-Fun Hon
(74) *Attorney, Agent, or Firm*—Brian A. Gomez; Gomez International Patent Office

(57) ABSTRACT

The present invention provides novel polyamic acids and polyimide optical alignment layers for inducing alignment of a liquid crystal medium. The novel compositions comprise reactive diamines containing a $C_3$–$C_{20}$ linear or branched hydrocarbon chains containing 1 to 4 carbon—carbon double bonds. The invention further describes liquid crystal displays comprising the novel polyimide optical alignment layers.

9 Claims, 1 Drawing Sheet

PHOTOSENSITIVE POLYIMIDES FOR OPTICAL ALIGNMENT OF LIQUID CRYSTALS

CROSS-REFERENCE TO RELATED APPLICATION

This application is a Continuation-in-part of application Ser. No. 09/618,193, filed Jul. 18, 2000 and issued as U.S. Pat. No. 6,313,348, Nov. 6, 2001, which is a divisional of application Ser. No. 09/221,295, filed Dec. 23, 1998 and issued as U.S. Pat. No. 6,103,322.

BACKGROUND OF INVENTION

The present invention relates to photosensitive materials for aligning liquid crystals, liquid crystal displays, and other liquid crystal optical elements.

Common to almost all liquid crystal based devices is a liquid crystal layer disposed between a pair of substrates coated with a polymeric alignment layer. The polymeric alignment layer controls the direction of alignment of the liquid crystal medium in the absence of an electric field. Usually the direction of alignment of the liquid crystal medium is established in a mechanical buffing process wherein the polymer layer is buffed with a cloth or other fiberous material. The liquid crystal medium contacting the buffed surface typically aligns parallel to the mechanical buffing direction. Alternatively, an alignment layer comprising anisotropically absorbing molecules can be exposed to polarized light to align a liquid crystal medium as disclosed in U.S. Pat. Nos. 5,032,009 and 4,974,941 "Process of Aligning and Realigning Liquid Crystal Media".

The process for aligning liquid crystal media with polarized light can be a noncontact method of alignment that has the potential to reduce dust and static charge buildup on alignment layers. Other advantages of the optical alignment process include high resolution control of alignment direction and high quality of alignment.

Requirements of optical alignment layers for liquid crystal displays include low energy threshold for alignment, transparency to visible light (no color), good dielectric properties and voltage holding ratios, long-term thermal and optical stability and in many applications a controlled uniform pre-tilt angle. Most liquid crystal devices, including displays, have a finite pre-tilt angle, controlled, for instance, by the mechanical buffing of selected polymeric alignment layers. The liquid crystal molecules in contact with such a layer aligns parallel to the buffing direction, but is not exactly parallel to the substrate. The liquid crystal molecules are slightly tilted from the substrate, for instance by about 2–15 degrees. For optimum performance in most display applications a finite and uniform pre-tilt angle of the liquid crystal is desirable.

In a continuing effort to develop optical alignment materials for commercial applications U.S. Pat. No. 6,103,322 (Gibbons et al.) describes novel polyamic acids comprising a dianhydride containing a diaryl ketone group, i.e. two aromatic rings linked by a carbonyl group, (e.g. benzophenonetetracarboxylic dianhydride) and an aromatic diamine containing an unsaturated alkyl side chain (e.g. geranyl or allyl group). Gibbons et al, recognized that polyamic acids combining these two structural units gave good quality alignment and better electrical properties (specifically, voltage holding ratio, VHR) than similar materials that lacked the unsaturated alkyl side-chain.

Herein are described new reactive side-chain polymers within the class of polyimides, polyamic acids and esters thereof, that give good quality alignment of liquid crystals and generate VHR properties superior to those previously achieved with optical alignment processing.

SUMMARY OF INVENTION

The present invention provides reactive side-chain polymers within the class of polyimides, polyamic acids and esters thereof, characterized in that they comprise identical or different repeat units selected from one or more of the formula

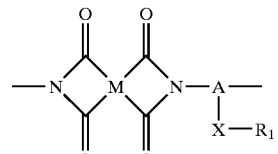

Ia

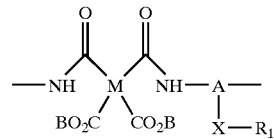

Ib wherein A is a trivalent unsubstituted or optionally fluoro-, chloro-, cyano-, alkyl-, alkoxy-, fluoroalkyl- or fluoroalkoxy-substituted aromatic or cycloaliphatic group; $R_1$ is a monovalent radical containing 1 to 4 carbon—carbon double bonds and is selected from the group of $C_3$–$C_{24}$ linear or branched aliphatic radicals, optionally interrupted by one to two 5- to 6-membered cycloaliphatic or aromatic radicals and optionally substituted with 1 to 3 heteroatoms selected from the group of oxygen, nitrogen and sulfur, wherein the carbon—carbon double bonds(s) are isolated from any other π system within the side-chain; X is selected from the group of covalent bond, —O—, —S—, and —NR—, wherein R is selected from H, $R_1$, and $C_1$–$C_4$ hydrocarbon chain; B is hydrogen or a monovalent organic group derived from an alcohol after formal removal of the hydroxyl group; and M is a tetravalent organic radical of a tetracarboxylic acid dianhydride after formal removal of the two —CO—O—CO— groups, the four valencies of which are distributed between four different carbon atoms of the radical; wherein when M comprises two or more aromatic rings, said aromatic rings are linked by one or two linkers, independently selected from the group of a covalent bond, —O—, —S—, —$NR_2$—, straight-chain and branched-chain alkylenes represented by —$(CH_2)_n$—, —$L_2$—$(CH_2)_n$—, —$(CH_2)_n$—$L_2$, —$L_2(CH_2)_n$—$L_3$—, each optionally mono- or poly-substituted by fluorine or chlorine and optionally chain interrupted by —O— or —$NR_2$—, wherein $L_2$ and $L_3$ are selected, independently, from the group of —O—, —S—, —$NR_2$—, —O—CO—, —CO—O—; $R_2$ is selected from H and $C_1$–$C_4$ hydrocarbon chain and n is 1 to 20.

DETAILED DESCRIPTION

Figure 1:
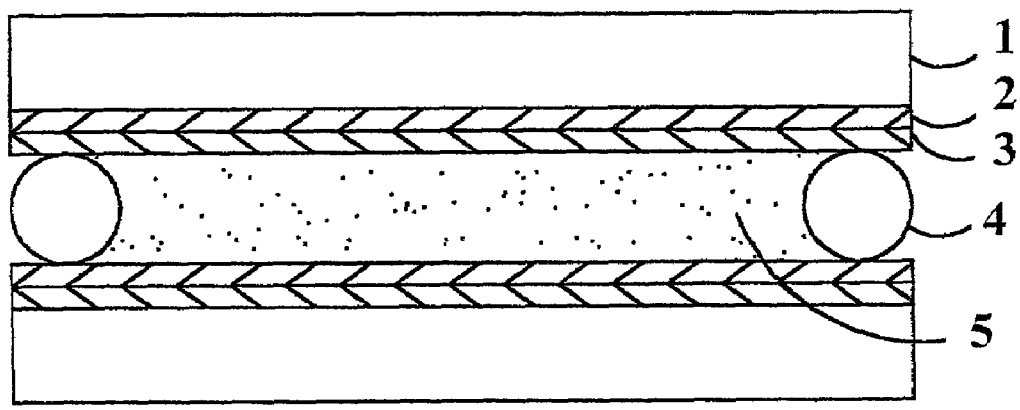
FIG. 1 is a cross-sectional view of a liquid crystal display element.

As used herein, the term "alignment layer" is the layer of material on the surface of a substrate that controls the alignment of a liquid crystal layer in the absence of an external field. A "conventional alignment layer" herein refers to an alignment layer that will only align a liquid crystal layer via processing other than optical means. For example, mechanically buffed polyimides, evaporated silicon dioxide, Langmuir-Blodgett films, have all been shown to align liquid crystals.

"Optical alignment layer" herein refers to an alignment layer that contains anisotropically absorbing molecules that will induce alignment of liquid crystals after exposure with polarized light. The optical alignment layer can be an isotropic medium or have some degree of anisotropy before optical alignment. Optical alignment layers may be processed by conventional means, such as mechanical rubbing, prior to or after exposure to polarized light. The anisotropically absorbing molecules of the optical alignment layers exhibit absorption properties with different values when measured along axes in different directions. The anisotropic absorbing molecules exhibit absorption bands between 150 nm and about 2000 nm. Most preferable optical alignment layers for the present invention have absorbance maxima of about from 150 to 400 nm and especially about from 300 to 400 nm.

Polymers especially useful and preferred as optical alignment layers are polyimides. Polyimides are known for their excellent thermal and electrical stability properties and these properties are useful in optical alignment layers for liquid crystal displays. The preparation of polyimides is described in "Polyimides", D. Wilson, H. D. Stenzenberger, and P. M. Hergenrother Eds., Chapman and Hall, New York (1990). Typically polyimides are prepared by the condensation of one equivalent of a diamine with one equivalent of a dianhydride in a polar solvent to give a poly(amic acid) prepolymer intermediate. Alternatively copolymer polyimides are prepared by the condensation of one or more diamines with one or more dianhydrides to give a copolyamic acid.

An alternative intermediate to polyimides are poly(amic esters) that can be made by esterification of poly(amic acids) with alcohols. The poly(amic esters) undergo thermal imidization to form polyimides.

Thus, poly(amic acids) and poly(amic esters) are considered to be closely related precursors to polyimides of the invention. Therefore, they are considered further embodiments of this invention. Furthermore, preimidized polyimides derived from chemical or thermal imidization of poly (amide acids) or poly(amide esters) are also considered an embodiment of the invention.

The poly(amic acid) is typically formulated to give a 1 to 30 wt % solution. The condensation reaction is usually performed between room temperature and 150° C. The prepolymer solution is coated onto a desired substrate and thermally cured at between 180 and 300° C. to complete the imidization process. Alternatively, the poly(amic acid) prepolymer is chemically imidized by addition of a dehydrating agent to form a polyimide polymer.

In preparing polyamic acids for optical alignment layers the molar ratio of diamine to dianhydride usually is 1:1, but can vary between 0.8:1 to 1.2:1. The preferred ratio of diamine to dianhydride is between 0.9:1 and 1.1:1.

The present invention provides reactive side-chain polymers within the class of polyimides, polyamic acids, and esters thereof, that are disclosed above. Within the disclosure, in defining the group A, the term "aromatic or cycloaliphatic group" includes one or more 5- and 6-membered aromatic and heteroaromatic rings, 9- and 10-membered fused aromatic and heteroaromatic rings, 4-, 5-, 6-, and 7-member saturated carbon rings, and 6- to 10-membered fused or bicyclic saturated or partially unsaturated carbon rings. The term "optionally substituted with 1 to 3 heteroatoms selected from the group of oxygen, nitrogen and sulfur" means that 1 to 3 carbon atoms in the aliphatic radical can be formally replaced by —O—, —NR— or —S—. The phrase "isolated from any other H-system within the side-chain" means that the carbon—carbon double bond(s) are not in direct conjugation to another π-system, for instance, an aromatic ring (e.g. stilbene), carbonyl group (e.g. acrylate) or combination of both (e.g. chalcone).

Preferred side-chain polymers of the invention are those wherein M is selected from the group

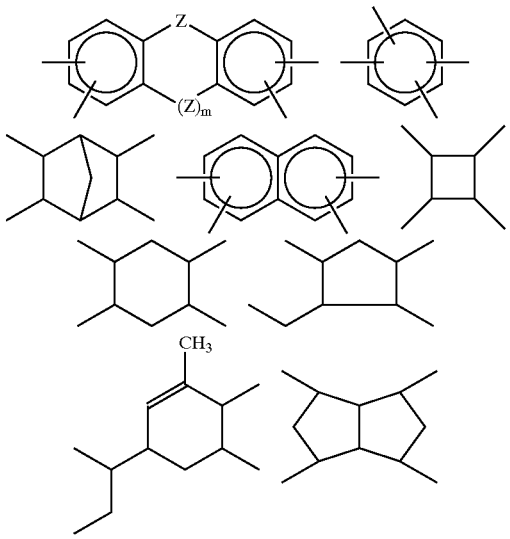

wherein Z is said linker noted above and m=1 or 0.

More preferred are polymers wherein M is

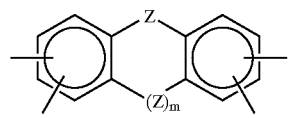

and Z is selected from the group of covalent bond, —O—, —NR$_2$, and —(CH$_2$)$_n$—, and m=0. Also more preferred are polymers of claim 2 wherein M is selected from the group

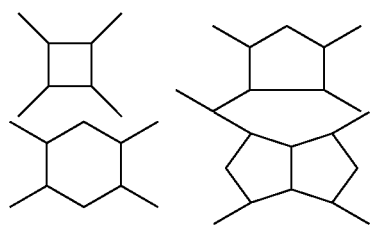

A further preference is for polymers wherein A is selected from the group

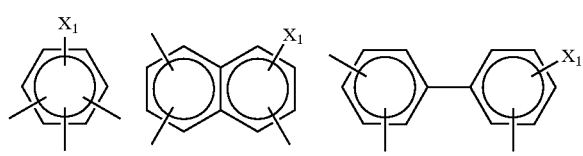

wherein X$_1$ is selected from the group of H, F, Cl, CN, alkyl, and alkoxy.

Preferably, within the side-chain, X is selected from the group of —O—, and —NR— and R$_1$ is selected from the group of allyl, geranyl, citronellyl, farnesyl and 3-methyl-2-butenyl.

A most preferred polymer comprises the repeat unit

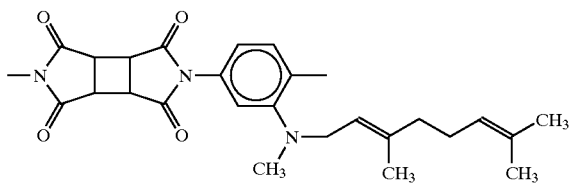

A wide variety of dianhydrides may be used in forming preferred polymers of the invention. Specific examples of preferred tetracarboxylic dianhydride components include aromatic dianhydrides such as pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3',4,4'-biphenyltetracarboxylic dianhydride (A2), 2,3,2',3'-biphenyltetracarboxylic dianhydride, bis(3,4-dicarboxyphenyl)ether dianhydride (A3), bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-butanetetracarboxylic dianhydride, 1,2,3,4-cyclobutanetetracarboxylic dianhydride (A1), 1,2,4,5-cyclohexanetetracarboxylic dianhydride, 2,3,5-tricarboxycyclopentylacetic acid dianhydride, 1,3,4,6-bicyclooctanetetracarboxylic dianhydride and 3,4-dicarboxy-1,2,3,4-tetrahydro-1-naphthalenesuccinic dianhydride; and their acid and acid chloride derivatives. 1,2,3,4-Cyclobutanetetracarboxylic dianhydride and 2,3,5-tricarboxycyclopentylacetic acid dianhydride are most preferred for preparing polyimides of the invention.

Examples of the diamines that are useful in forming polymers of the invention are listed in Table 1. The syntheses of these diamines is discussed in U.S. Pat. No. 6,103,322 and is hereby incorporated by reference. These diamines are sensitive to air and easily undergo oxidation to give colored products. The diamines are stored and handled under inert conditions to avoid the formation of colored oxidation products.

A variety of other diamines may be useful in the preparation of novel copolyamic acids of the invention including aromatic diamines such as are 2,5-diaminobenzonitrile, 2-(trifluoromethyl)-1,4-benzenediamine, p-phenylenediamine, 2-chloro-1,4-benzenediamine, 2-fluoro-1,4-benzenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenylsulfone, diaminonaphthalene, 1,4-bis(4-aminophenoxy)benzene, 4,4'-diaminobenzophenone, 3,4'-diaminobenzophenone, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane and 2,2-bis[4-(4-aminophenoxy)phenyl]hexafluoropropane; alicyclic diamines such as bis(4-aminocyclohexyl)methane; and aliphatic diamines such as tetramethylenediamine and hexamethylene diamine. Further, diaminosiloxanes such as bis(3-aminopropyl)tetramethyldisiloxane may be used. Such diamines may be used alone or in combination as a mixture of two or more of them.

Preferably the novel polyamic acids of the invention comprise about from 1 to 100 mol % of structure Ib; more preferably from 5 to 50 mol % of structure Ib; and most preferably from 5 to 25 mol % of structure Ib. A higher mol % of structure Ib tends to give a higher degree of reactivity and improved electrical properties. However, improvement in voltage holding ratio (VHR) and the photosensitivity of the polyimide optical alignment layer is often observed at relatively low loading of structure Ib in a copolyamic acid.

The term "reactive" is not meant to restrict the side-chain polymers to a specific mode of action. Rather, the term is meant to suggest to the artisian how the polymers may perform their function. To speculate, the double bonds may provide reactivity that allows a change in the chemical environment of the side-chain during and/or after exposure to polarized light. This change may be caused by bond forming, bond breaking, isomerization or some combination. In any event, the invention is not restricted to a specific mechanism of action.

To prepare the optical alignment layers the poly(amic acid) solutions or preimidized polyimide solutions are coated onto desired substrates. Coating is usually accomplished with 2 to 30 wt % solids. Any conventional method may be used to coat the substrates including brushing, spraying, spin-casting, meniscus coating, dipping or printing. The preferred techniques for coating substrates demonstrated in the Examples are spinning and printing. However, the optical alignment materials of the invention are not limited to use in printing or spinning processes.

The coated substrates are heated in an oven under air or an inert atmosphere, for instance nitrogen or argon, at elevated temperature usually not exceeding 300° C. and preferably at or below 200° C. for about from 1 to 12 hours, preferably for about 2 hours or less. The heating process removes the solvent carrier and may be used to further cure the polymer. For instance, the poly(amic) acid films are thermally cured to generate polyimide films.

The concentration of polymer and choice of solvents can affect the optical alignment quality, pretilt and VHR. For example, the optical alignment quality has been observed to improve under the same exposure conditions when the concentration of polymer is decreased in solution. In addition, the choice of solvent, co-solvents and cure conditions can also affect the alignment quality and electrical properties. A correlation between film thickness and alignment quality also is evident. In particular, the optical alignment quality improves with decreasing thickness. Similarly, VHR can increase with decreasing film thickness.

The optical alignment layers are exposed to polarized light to induce alignment of liquid crystals. By "polarized light" is meant light that is elliptically polarized such that the light is more polarized along one axis (referred to as the major axis) versus the orthogonal axis (referred to as the minor axis). In this invention the polarized light has one or more wavelengths of about from 150 to 2000 nm and preferably of about from 150 and 1600 nm and more preferably about from 150 to 800 nm. Most preferably, the polarized light has one or more wavelengths of about from 150 to 400 nm, and especially about from 300 to 400 nm. A preferred source of light is a laser, e.g., an argon, helium neon, or helium cadmium. Other preferred sources of light are mercury arc deuterium and quartz tungsten halogen lamps, xenon lamps, microwave excited lamps and black lights in combination with a polarizer. Polarizers useful in generating polarized light from nonpolarized light sources are interference polarizers made from dielectric stacks, absorptive polarizers, diffraction gratings and reflective polarizers based on Brewster reflection. With lower power lasers or when aligning small alignment regions, it may be necessary to focus the light beam onto the optical alignment layer.

By "exposing" is meant that polarized light is applied to the entire optical alignment layer or to a portion thereof. The light beam may be stationary or rotated. Ace Exposures can be in one step, in bursts, in scanning mode or by other methods. Exposure times vary widely with the materials used, etc., and can range from less than 1 msec to over an hour. Exposure may be conducted before or after contacting the optical alignment layer with the liquid crystal medium. Exposing can be accomplished by linearly polarized light transmitted through at least one mask having a pattern or with a beam of linearly polarized light scanned in a pattern. Exposing also may be accomplished using interference of coherent optical beams forming patterns, i.e., alternating dark and bright lines.

Exposure energy requirements vary with the formulation and processing of the optical alignment layer prior and during exposure. A preferred range of exposure energy is about from 0.001 to 100 $J/cm^2$ and most preferred range of exposure energy is about from 0.001 to 5 $J/cm^2$. Lower exposure energy is most useful in large scale manufacturing of optical alignment layers and liquid crystal display elements. Lower exposure energy also minimizes the risk of damage to other materials on the substrates.

The efficiency of the alignment process, and the exposure energy required, may be further impacted by heating, beyond that inherent in the "exposing" step. Additional heating during the exposing step may be accomplished by conduction, convection or radiant heating, or by exposure to unpolarized light. Additional heating may increase the mobility of the molecules during exposure and improve the alignment quality of the optical alignment layer. Additional heating is not a requirement of the process of the invention but may give beneficial results.

The quality of alignment and electrical properties of the liquid crystal cell assembled from exposed substrates can be improved by heating the substrates after exposure but prior to assembly of the cell. This additional heating of the substrates is not a requirement of the process but may give beneficial results.

Exposing also can consist of two or more exposure steps wherein the conditions of each step such as angle of incidence, polarization state, energy density, and wavelength are changed. At least one of the steps must consist of exposure with linearly polarized light. Exposures can also be localized to regions much smaller than the substrate size to sizes comparable to the entire substrate size. A preferred method of dual exposing comprises a two step process of:
  (a) exposing at least one optical alignment layer to polarized light at a normal incidence, and
  (b) exposing the optical alignment layer to polarized light at an oblique incidence.

Applying a liquid crystal medium to the optical alignment can be accomplished by capillary filling of a cell, by casting of a liquid crystal medium onto an optical alignment layer, by laminating a preformed liquid crystal film onto an optical alignment layer or by other methods. Preferred methods are capillary filling of a cell, injection filling and casting of a liquid crystal medium onto an optical alignment layer. Optical alignment layers are pre-exposed to polarized light or they are exposed after contacting the liquid crystal medium.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer.

As liquid crystal substances used for liquid crystal optical elements, nematic liquid crystal substances, ferroelectric liquid crystal substances, etc. are usable. Useful liquid crystals for the invention described herein include positive dielectric liquid crystals including 4-cyano-4'-alkylbiphenyls, 4-cyano-4'-alkyloxybiphenyls, 4-alkyl-(4'-cyanophenyl)cyclohexanes, 4-alkyl-(4'cyanobiphenyl)cyclohexanes, 4-cyanophenyl-4"alkylbenzoates, 4-cyanophenyl-4'alkyloxybenzoates, 4-alkyloxyphenyl-4'cyanobenzoates, 4-alkylphenyl-4'alkylbenzoates, 1-(4'-alkylphenyl)-4-cyanopyrimidines, 1-(4'-alkyloxyphenyl)-4-cyanopyrimidines and 1-(4-cyanophenyl)-4-alkylpyrimidines. Other useful liquid crystals are new superfluorinated liquid crystals available from EM Industries, (Hawthrone N.Y.) including the commercial materials: ZLI-5079, ZLI-5080, ZLI-5081, ZLI-5092, ZLI-4792, ZLI-1828, MLC-2016, MLC-2019, MLC-6252 and MLC-6043. Other useful nematic materials for practicing the invention include the commercial liquid crystals available from Lodic Co., Ltd, (Tokyo, Japan) including the DLC series: 22111, 22112, 22121, 22122, 23070, 23170, 23080, 23180, 42111, 42112, 42121, 42122, 43001, 43002, 43003, 63001, 63002, 63003, 63004, and 63005.

The invention is not limited to the use of liquid crystals defined above. One skilled in the art will recognize that the invention will be of value with many diverse liquid crystal structures and formulations containing mixtures of liquid crystals.

A liquid crystal display element of the invention is composed of an electrode substrate having at least one polyimide optical alignment layer derived from a polyamic acid of Structure Ib (above), a voltage-impressing means and a liquid crystal material. FIG. 1 illustrates a typical liquid crystal display element, comprising a transparent electrode 2 of ITO (indium-tin oxide) or tin oxide on a substrate 1 and optical alignment layers 3 formed thereon. The optical alignment layers are exposed to polarized light of a wavelength or wavelengths within the absorption band of the anisotropically absorbing molecules. A spacer concurrently with a sealing resin 4 is intervened between a pair of optical alignment layers 3. A liquid crystal 5 is applied by capillary filling of the cell and the cell is sealed to construct a liquid crystal display element. Substrate 1 may comprise an overcoat film such as an insulating film, a color filter, a color filter overcoat, a laminated polarizing film etc. These coatings and films are all considered part of the substrate 1. Further, active elements such as thin film transistors, a nonlinear resistant element, etc. may also be formed on the substrate 1. These electrodes, undercoats, overcoats, etc. are conventional constituents for liquid crystal display elements and are usable in the display elements of this invention. Using the thus formed electrode substrate, a liquid crystal display cell is prepared, and a liquid crystal substance is filled in the space of the cell, to prepare a liquid crystal display element in combination with a voltage-impressing means.

Optical alignment layers of the invention are compatible with all liquid crystal display modes. A liquid crystal display element of the invention can comprise a variety of display configurations including twisted nematic, super twisted nematic, in-plane-switching, vertical alignment, active-matrix, cholesteric, polymer dispersed, ferroelectric, anti-ferroelectric and multi-domain liquid crystal displays. Although the display modes demonstrated in this specification are primarily twisted nematic, the optical alignment layers of the invention are not limited to use in twisted nematic liquid crystal displays.

Optical alignment layers of the invention are useful in many other liquid crystal devices other than liquid crystal displays. These include electro-optical light modulators, all-optical light modulators, erasable read/write optical data storage media; diffractive optical components such as gratings, beamsplitters, lenses (e.g., Fresnel lenses), passive imaging systems, Fourier processors, optical disc and radiation collimators; binary optical devices formed by combining refractive and diffractive optics including eyeglasses, cameras, night vision goggles, robotic vision and three-dimensional image viewing devices; and holographic devices such as heads-up displays and optical scanners.

Voltage Holding Ratio (VHR) is a critical electrical parameter for liquid crystal displays. VHR is a measure of the LCDs ability to retain a voltage during the time between pixel updates (frame time). The type of liquid crystal, alignment layers and cell geometry can all affect the measured VHR value. In the examples to follow, liquid crystal test cells comprising soda-lime substrates with patterned indium-tin-oxide (ITO) transparent electrodes are described. The overlap of the electrodes was about 1 $cm^2$ after the test cell was assembled. Approximately 2–3 inch wire leads were attached to the patterned ITO electrodes using an ultrasonic solder iron after the test cell is assembled but prior to filling. The leads were attached to a VHR measurement system (Elsicon VHR-100 Voltage Holding Ratio Measurement System, Wilmington, Del.) using test clips after the cell was filled and annealed. The VHR for the examples was measured for a 20 msec frame time, which is typically used for measuring VHR, with an applied voltage of 1 volt. The VHR measured at 75° C. for the various exposure conditions is summarized in Table 2.

Comparison of Examples 3, 4, and 5 indicate that cells fabricated with polyimides of the invention have substantially higher VHR than a cell fabricated with polyimides that lack the reactive double bonds in the side chains. Comparison of Example 6 with 7 and 8 indicate that VHR can be improved by substituting a portion or all of a commonly used diamine with a reactive diamine of the invention.

TABLE 1

Crosslinking Diamines.

| Diamine No. | Structure |
|---|---|
| 1 | |
| 2 | |
| 3 | |
| 4 | |
| 5 | |
| 6 | |

TABLE 1-continued

Crosslinking Diamines.

| Diamine No. | Structure |
|---|---|
| 7 | 2,4-diamino-N-methyl-N-[(CH₂)₈-CH=CH-C₈H₁₇]-aniline |
| 8 | 2,4-diamino-N-methyl-N-(3-methyl-2-butenyl)-aniline |
| 9 | 2,4-diamino-phenyl citronellyl ether |
| 10 | 2,5-diamino-N-methyl-N-citronellyl-aniline |
| 11 | 2,5-diamino-N-methyl-N-farnesyl-aniline |
| 12 | 2,4-diamino-N-methyl-N-geranyl-aniline |
| 13 | 2,5-diamino-N-methyl-N-(3-methyl-2-butenyl)-aniline |
| 14 | 2,4'-diamino-2'-(N,N-diallylamino)biphenyl |

TABLE 2

Optical Alignment of Polyimide Compositions.

| Example No. | Polyimide Composition Dianhydride | Diamine(s) | Lamp Exposure J/cm² | Alignment Quality | VHR 75° C. | Contrast |
|---|---|---|---|---|---|---|
| 3 | A1 | 1 | 10 | X+ | 0.911 | 10:1 |
|   |   |   | 20 | Δ+ | 0.903 | 55:1 |
| 4 | A1 | 2 | 10 | Δ+ | 0.901 | 98:1 |
|   |   |   | 20 | Δ+ | 0.914 | 177:1 |
| 5 compar. | A1 | 15 | 10 | Δ | 0.73 | 81:1 |
|   |   |   | 20 | Δ | 0.83 | 76:1 |
| 6 compar. | A1 | 16 | 10 | Δ | 0.58 | 75:1 |
|   |   |   | 20 | ○ | 0.56 | 95:1 |
| 7 | A1 | 16, 6 (4:1) | 10 | Δ+ | 0.742 | 378:1 |
|   |   |   | 20 | Δ++ | 0.717 | 348:1 |
| 8 | A1 | 6 | 10 | Δ | 0.876 | 257:1 |
|   |   |   | 20 | Δ | 0.835 | 179:1 |
| 9 | A1 | 14 | 10 | ○ | 0.879 | 196:1 |
|   |   |   | 20 | ○ | 0.823 | 316:1 |
| 10 | A2 | 14 | 10 | Δ | 0.723 | 232:1 |
|   |   |   | 20 | ○ | 0.596 | 375:1 |
| 11 | A1 | 13 | 10 | Δ | 0.877 | 126:1 |
|   |   |   | 20 | Δ | 0.845 | 148:1 |
| 12 | A3 | 6 | 10 | Δ | 0.806 | 82:1 |
|   |   |   | 20 | Δ | 0.812 | 73:1 |

• Excellent alignment, no flow effects, high uniformity.
○ Good alignment, low flow effects, uniform.
Δ Fair alignment, flow effects, some nonuniformity (mottled or cloudy background).
X Poor alignment, severe flow effects, nonuniform.
+Levels of improvement, Δ < Δ+ < Δ++ < ○.
A1 = 1,2,3,4-cyclobutanetetracarboxylic dianhydride
A2 = 3,4,3',4'-biphenyltetracarboxylic dianhydride
A3 = bis(3,4-dicarboxyphenyl)ether dianhydride
Diamine 15 = 4-(N,N-dipropylamino)-1,3-benzenediamine
Diamine 16 = oxy(dianiline)

The following examples are meant to exemplify the embodiments and are not meant to limit the scope of the invention.

EXAMPLE 1

This example illustrates the synthesis of diamine 13.

N-(3-methyl-2-butenyl)-N-methyl amine was first prepared by addition of 4-Bromo-2-methyl-2-butene (15.0 g) to a stirred solution of 40% aqueous methyl amine (110 mL), diethyl ether (110 mL) and methanol (50 mL). The mixture was extracted and the extracts dried over potassium carbonate and distilled to give the N-(3-methyl-2-butenyl)-N-methyl amine (5.25 g, bp 80–89 C.).

N-(3-methyl-2-butenyl)-N-methyl amine (5.20 g) was stirred with 3-fluoro-4-nitroaniline (3.12 g), triethyl amine (6.2 mL) and N-methylpyrrolidinone (NMP, 30 mL) at 80–85° C. for 10 hr. The mixture was extracted with water and diethyl ether. The extract was purified by chromatography on silica gel to give 3-[N-(3-methyl-2-butenyl)-N-methyl]amino-4-nitroaniline.

3-[N-(3-methyl-2-butenyl)-N-methyl]amino-4-nitroaniline (4.55 g) was treated with tin (II) chloride dihydrate (18.0 g) in ethanol (100 mL) and 10 N hydrochloric acid (16 mL, added last) at ambient temperature for 9 hr. The mixture was basified with chilled 20 wt % potassium hydroxide (160 g), extracted with diethyl ether and the extract purified by chromatography on silica gel to give diamine 13 (1.0 g) as a light amber oil.

EXAMPLE 2

This example illustrate the synthesis of diamine 14.

A mixture of 4,4'-dinitro-2-biphenylamine (10.0 g), allyl bromide (20 mL), potassium carbonate (16 g) and NMP (100 mL) was heated to 90–95° C. for 90 hr. The mixture was extracted with tetrahydrofuran (THF)-ethyl acetate-water and purified by crystallization from ethyl acetate to give N,N-diallyl-4,4'-dinitro-2-biphenylamine (7.0 g).

N,N-diallyl-4,4'-dinitro-2-biphenylamine (5.1 g), was treated with tin (II) chloride dihydrate (33.9 g, added last) in ethanol-THF (100 mL, 1:1) and 10 N hydrochloric acid (18 mL) at 30° C. for 16 hr. The mixture was basified with chilled 20 wt % potassium hydroxide (300 g), extracted with diethyl ether-THF and the extract purified by chromatography on silica gel to give diamine 14 (4.5 g) as an oil.

EXAMPLE 3

A mixture of 1,2,3,4-cyclobutanetetracarboxylic dianhydride (114 mg, 0.58 mmol), diamine1 (118.1 mg, 0.58 mmol), and NMP (0.92 g) was stirred at 18° C. for 18 h under a nitrogen atmosphere. The polyamic acid solution was diluted to 5 wt % with γ-butyrolactone (3.49 g) for spinning thin films.

The following procedure was used to fabricate test cells for materials described in Examples 3 to 12.

Two 0.9 inch by 1.2 inch by 1 millimeter thick soda lime glass substrates with transparent indium-tin-oxide (ITO) coatings (DCI, Inc. Lenexa, Kans. 66219) were spin-coated and cured with the polyamic acid formulation to give optical alignment layers. Spin coating was achieved by filtering the prepolymer solution through a 0.45 micron Teflon filter membrane onto the surface of clean ITO substrates. The substrates were spun at 2500 RPM for 1 minute to produce uniform thin films. The resultant thin films were cured in air for 0.25 hr at 80° C. followed by 1 h at 200° C.

The substrates were then exposed to polarized UV light with a model E2-SEM1 optics module in an OptoAlign™ model E2-UV-600-SS-AA lamp exposure unit (Elsicon, Inc., Newark, Del.).

After exposure, the substrates were assembled with orthogonal orientation of the optically generated alignment direction. The cell thickness was about 4 microns. The cell was subsequently capillary filled with nematic liquid crystals suitable for active matrix liquid crystal displays. As expected, the liquid crystals were observed to align in a twisted nematic orientation when viewed between polarizers. Upon annealing the liquid crystal cell above the liquid crystal isotropic point (120° C. for 30 minutes), the uniformity of the alignment was observed to improve. Table 2 lists the exposure energy levels, alignment quality, VHR, and contrast exhibited by the cells fabricated for the Examples 3 through 12 after annealing. Contrast commonly is used as a secondary criteria to aid determination of alignment quality. Pre-tilt in all cases was measured to be less than 1 degree.

EXAMPLE 4

A mixture of 1,2,3,4-cyclobutanetetracarboxylic dianhydride (109.8 mg, 0.56 mmol), diamine 2 (113.7 mg, 0.56 mmol), and NMP (0.88 g) was stirred at 18° C. for 18 h under a nitrogen atmosphere. The polyamic acid solution was diluted to 5 wt % with γ-butyrolactone (3.35 g) for spinning thin films.

EXAMPLE 5 (comparative)

A mixture of 1,2,3,4-cyclobutanetetracarboxylic dianhydride (108.5 mg, 0.553 mmol), 4-(N,N-dipropylamino)-1,3-benzenediamine (114.6 mg, 0.553 mmol), and NMP (0.88 g) was stirred at 18° C. for 18 h under a nitrogen atmosphere. The polyamic acid solution was diluted to 5 wt % with γ-butyrolactone (3.42 g) for spinning thin films.

EXAMPLE 6 (comparative)

A mixture of 1,2,3,4-cyclobutanetetracarboxylic dianhydride (98 mg, 0.50 mmol), 4,4'-oxy(dianiline) (100.1 mg, 0.50 mmol), and NMP (1.12 g) was stirred at 18° C. for 18 h under a nitrogen atmosphere. The polyamic acid solution was diluted to 2 wt % with γ-butyrolactone (3.49 g) and NMP (4.95 g) for spinning thin films.

EXAMPLE 7

A mixture of 1,2,3,4-cyclobutanetetracarboxylic dianhydride (164.4 mg, 0.838 mmol), 4,4'-oxydianiline (134.3 mg, 0.67 mmol), diamine 6 (45.8 mg, 0.167 mmol) and NMP (1.38 g) was stirred at 18° C. for 18 h under a nitrogen atmosphere. The polyamic acid solution was diluted to 5 wt % with γ-butyrolactone (5.12 g) for spinning thin films.

EXAMPLE 8

A mixture of 1,2,3,4-cyclobutanetetracarboxylic dianhydride (107.3 mg, 0.55 mmol), diamine 6 (149.5 mg, 0.55 mmol), γ-butyrolactone (1.45 g) and NMP (1.0 g, added last) was stirred at 18° C. for 18 h under a nitrogen atmosphere. The polyamic acid solution was diluted to 5 wt % with γ-butyrolactone (2.48 g) for spinning thin films.

EXAMPLE 9

A mixture of 1,2,3,4-cyclobutanetetracarboxylic dianhydride (100.6 mg, 0.51 mmol), diamine 14 (143.2 mg, 0.51 mmol), and γ-butyrolactone (2.20 g) was stirred at 18° C. for 18 h under a nitrogen atmosphere. The polyamic acid solution was diluted to 5 wt % with γ-butyrolactone (2.44 g) for spinning thin films.

EXAMPLE 10

A mixture of 3,4,3',4'-biphenyltetracarboxylic dianhydride (152.8 mg, 0.52 mmol), diamine 14 (145 mg, 0.52 mmol), and NMP (1.72 g) was stirred at 18° C. for 18 h under a nitrogen atmosphere. The polyamic acid solution was diluted to 5 wt % with NMP (3.98 g) for spinning thin films.

EXAMPLE 11

A mixture of 1,2,3,4-cyclobutanetetracarboxylic dianhydride (104.1 mg, 0.53 mmol), diamine 13 (108.9 mg, 0.53 mmol), and NMP (1.19 g) was stirred at 18° C. for 18 h under a nitrogen atmosphere. The polyamic acid solution was diluted to 5 wt % with γ-butyrolactone (2.86 g) for spinning thin films.

EXAMPLE 12

A mixture of bis(3,4-dicarboxyphenyl)ether dianhydride (161.0 mg, 0.52 mmol), diamine 6 (141.8 mg, 0.52 mmol), and NMP (1.7 g) was stirred at 18° C. for 18 h under a nitrogen atmosphere. The polyamic acid solution was diluted to 5 wt % with γ-butyrolactone (4.02 g) for spinning thin films.

What is claimed is:

1. Reactive side chain polymers within the class of polyimide, polyamic acids and esters thereof, characterized in that they comprise identical or different repeat units selected from at least one of the formulas:

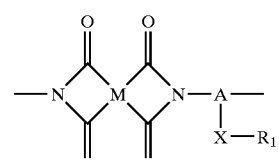

Ia

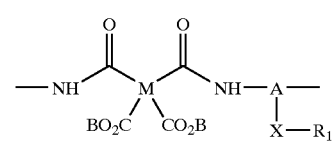

Ib wherein A is a trivalent unsubstituted or optionally fluoro-, chioro-, cyano-, alkyl-, alkoxy-, fluoroalkyl- or fluoroalkoxy-substituted aromatic or cycloaliphatic group; $R_1$ is a monovalent radical containing 1 to 4 on-carbon double bonds and is selected from the group of $C_3$–$C_{24}$ linear or branched aliphatic radicals, optionally interrupted by one to two 5- to 6-membered cyctoaliphatic or aromatic radicals and optionally substituted with 1 to 3 hetero atoms selected from the group of oxygen, nitrogen and sulfur, wherein the carbon—carbon double bonds(s) are isolated from any other π system within the side-chain; X is selected from the group of covalent bond, —O—, —S—, and —NR—, wherein R is selected from H, $R_1$, and $C_1$–$C_4$ hydrocarbon chain; B is hydrogen or a monovalent organic group derived from an alcohol after formal removal of the hydroxyl group; and a tetravalent organic radical of a tetracarboxylic acid dianhydride after formal removal of the two —CO—O—CO— groups, the four valencies of which are distributed between four different carbon atoms of the radical; wherein when M comprises two or more aromatic rings, said aromatic rings are linked by one or two linkers, independently selected from the group of a covalent bond —O—, —S—, —NR$_2$, straight-chain and branched-chain alkylenes represented by —(CH$_2$)n—,—L$_2$(CH$_2$)$_n$—,—(CH$_2$)$_n$—L$_2$, —L$_2$(CH$_2$)$_n$—L$_3$—, each optionally mono- or poly-substituted by fluorine or chlorine and optionally chain interrupted by —O—, or —NR$_2$, wherein L$_2$ and L$_3$ are selected, independently, from the group of —O—, —S—, —NR$_2$—, —O—CO—, —CO—O—; R$_2$ is selected from H and C$_1$–C$_4$ hydrocarbon chain and n is 1 to 20.

2. Polymers of claim 1 wherein M is selected from the group

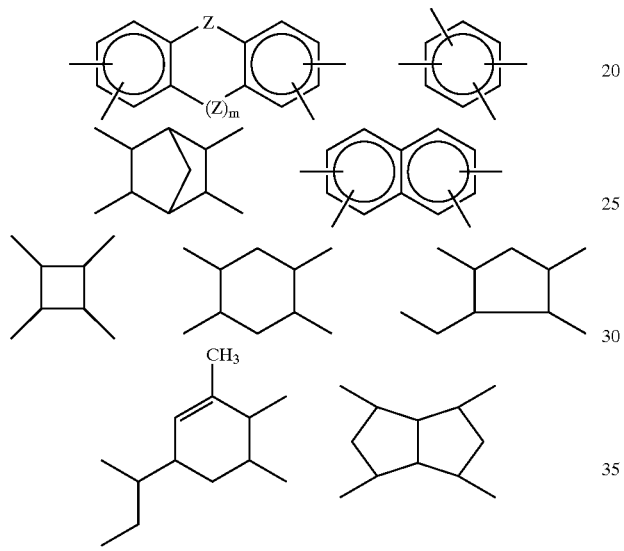

wherein Z is said linker and m=1 or 0.

3. Polymers of claim 2 wherein A is selected from the group

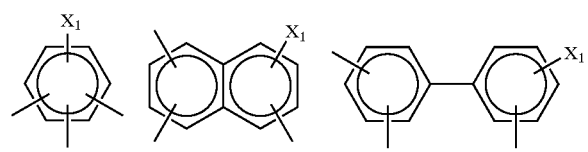

wherein X$_1$ is selected from the group of H, F, Cl, CN, alkyl, and alkoxy.

4. Polymers of claim 3 wherein X is selected from the group of —O—, and —NR— and R$_1$ is selected from the group of allyl, geranyl, citronellyl, farnesyl and 3-methyl-2-butenyl.

5. Polymers of claim 2 wherein M is

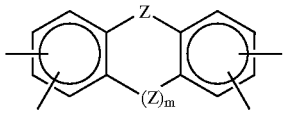

and Z is selected from the group of covalent bonds —O—, —NR$_2$, and —(CH$_2$)—, and m=0.

6. Polymers of claim 2 wherein M is selected from the group

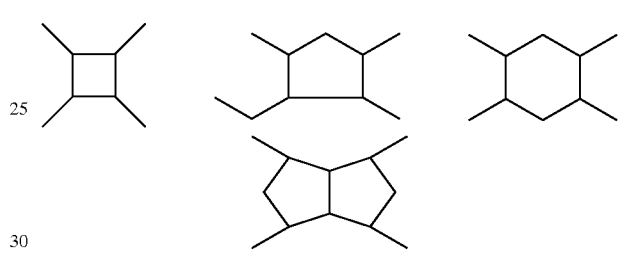

7. A polymer of claim 4 comprising the repeat unit

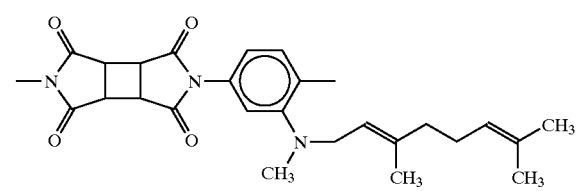

.

8. Optical alignment layers made with the polymers of claim 1.

9. Liquid crystal displays made with optical alignment layers of claim 8.

* * * * *

UNITED STATES PATENT AND TRADEMARK OFFICE
CERTIFICATE OF CORRECTION

PATENT NO. : 7,005,165 B2
APPLICATION NO. : 09/739937
DATED : February 28, 2006
INVENTOR(S) : Gibbons et al.

It is certified that error appears in the above-identified patent and that said Letters Patent is hereby corrected as shown below:

Col. 16, Claim 1, line 54: change "containing 1 to 4 on-carbon" to --containing 1 to 4 carbon-carbon--

Signed and Sealed this

Twenty-seventh Day of February, 2007

JON W. DUDAS
*Director of the United States Patent and Trademark Office*